United States Patent [19]

Itoh

[11] Patent Number: 5,281,734

[45] Date of Patent: Jan. 25, 1994

[54] SHORT-WAVELENGTH-ABSORBING POLYSILANE

[75] Inventor: Takao Itoh, Tokyo, Japan

[73] Assignee: Dow Corning Japan, Ltd., Tokyo, Japan

[21] Appl. No.: 42,954

[22] Filed: Apr. 5, 1993

[30] Foreign Application Priority Data

May 18, 1992 [JP] Japan .................. 04-124990

[51] Int. Cl.⁵ .................. C07F 7/08; C08G 77/24
[52] U.S. Cl. ........................ 556/406; 528/42
[58] Field of Search ............... 556/406; 528/42

[56] References Cited

U.S. PATENT DOCUMENTS 5,089,646  2/1992  Berris .................. 556/406
5,089,648  2/1992  Berris .................. 556/406 X

OTHER PUBLICATIONS

Masaie Fujino et al, Macromolecules, vol. 25, p. 1079, (1992).

Primary Examiner—Paul F. Shaver
Attorney, Agent, or Firm—William F. Boley

[57] ABSTRACT

The present invention relates to a novel polysilane composition and, more specifically, to a polysilane composition that is soluble in organic solvents, that has a molecular weight in the range of 2,000 to 1,000,000; and that has a short-wavelength ($\leq 285$ nm) absorption maximum at room temperature.

2 Claims, No Drawings

SHORT-WAVELENGTH-ABSORBING POLYSILANE

BACKGROUND OF INVENTION

The present invention relates to a novel polysilane composition and, more specifically, to a polysilane composition that is soluble in organic solvents, that has a molecular weight in the range of 2,000 to 1,000,000, and that has a short-wavelength ($\leq 285$ nm) absorption maximum at room temperature.

Polysilanes are currently under investigation as conductive materials, photoconductive materials, nonlinear optical materials, and photoresists. However, since these materials generally absorb in the 300 to 400 nm region, the exploitation of their nonlinear optical properties requires polysilanes that absorb at shorter wavelengths. Moreover, utilization as a deep UV patterning material also requires polysilanes that absorb at shorter wavelengths. To date, the soluble high-molecular-weight polysilane with the shortest absorption wavelength is (3,3,3-trifluoropropyl)methylpolysilane $$-[CF_3CH_2CH_2(CH_3)Si]_n-$$

as described by Masaie Fujino, et al., Macromolecules, Volume 25, p. 1079, (1992).

The present invention takes as its object the introduction of a high-molecular-weight polysilane that absorbs at shorter wavelengths and is also soluble in organic solvents.

SUMMARY OF INVENTION

The present invention relates to a novel polysilane composition and, more specifically, to a polysilane composition that is soluble in organic solvents, that has a molecular weight in the range of 2,000 to 1,000,000, and that has a short-wavelength ($\leq 285$ nm) absorption maximum at room temperature.

DESCRIPTION OF INVENTION

The present invention comprises a random polysilane composition having an average molecular weight within a range of 2,000 to 1,000,000 and described by formula $$-(Si)_m-(SiR^1R^2)_n-, \quad \overset{R^3}{\underset{|}{|}} \tag{1}$$

where $R^1$ is described by formula $-(CH_2)_xCF_3$ in which $x=2$, 3, or 4; each $R^2$ is independently selected from a group consisting of alkyls comprising one to five carbon atoms; $R^3$ is selected from a group consisting of $-C_5H_{10}-$ and $-C_4H_8-$; $0.25 \leq n/m \leq 100$ when $R^3$ is $-C_5H_{10}-$, and $0.01 \leq n/m \leq 100$ when $R^3$ is $-C_4H_8-$.

Values of n/m below 0.25 for when $R^3$ is $-C_5H_{10}-$ result in poor solubility in ordinary organic solvents, while values of n/m above 100 for when $R^3$ is $-C_5H_{10}-$ make the occurrence of an absorption maximum at $>285$ nm increasingly likely. When n/m does not fall within the interval defined by $0.01 \leq n/m \leq 100$ for when $R^3$ is $-C_4H_8-$, the occurrence of an absorption maximum at $>285$ nm is again increasingly likely.

The molecular weight of the polysilane of the present invention must fall in the range of 2,000 to 1,000,000, but the range of 4,000 to 100,000 is generally preferred.

The method for synthesizing polysilane according to the present invention is not specifically restricted, but this polysilane is typically synthesized by a Wurtz-type Na reduction. The reaction solvent again is not specifically restricted; however, solvents generally used for this reaction, e.g., toluene or (toluene/diglyme) mixed solvent, can be used in the present case.

While the reaction temperature is also not specifically restricted, the general trend is for higher temperatures (for example, $\geq 120°$ C.) to provide better polymer synthesis yields. In some cases the yield can be increased by irradiating the mixture with ultrasound. In addition, suitable additives such as, for example, crown ether, may be added tot he reaction solution. Operative reaction techniques include the standard method of adding monomer to the reaction solution as well as reverse addition in which Na is added to the reaction solution.

The standard method is specifically exemplified by the addition while heating at reflux of $R^1R^2SiCl_2$ and $$\overset{R^3}{\underset{|}{|}} SiCl_2,$$

where $R^1$, $R^2$, and $R^3$ are as defined above, to solvent containing the appropriate quantity of Na; reaction for an additional several hours while heating under reflux and stirring vigorously; and finally addition of an alcohol such as isopropyl alcohol after completion of the reaction in order to precipitate the polysilane.

In the reverse addition method, $R^1R^2SiCl_2$ and $$\overset{R^3}{\underset{|}{|}} SiCl_2,$$

where $R^1$, $R^2$, and $R^3$ are defined as above, are both added tot he solvent; Na is added while heating under reflux; and the reaction is subsequently run as in the standard method to obtain the compound of the present invention.

The present invention is explained below using illustrative examples, but the present invention is not limited by these examples.

Example 1. 70 mL dry toluene and then 1.15 g sodium were introduced into a 200 mL four-neck flask equipped with a condenser, addition funnel, and stirrer. While heating this liquid mixture at reflux with vigorous stirring, a liquid mixture of 3.744 g of 3,3,3-trifluoropropylmethyldichlorosilane, 1.02 g cyclopentamethylenedichlorosilane, and 1.5 g dry toluene was carefully added dropwise from the addition funnel. The reaction was run for another 8 hours by vigorously stirring under reflux. After completion of the reaction, isopropyl alcohol was added to the reaction solution in order to precipitate the polysilane. This was then washed with water, filtered, and dried to afford a colorless solid polysilane (8.5% yield).

The average molecular weight of this material was measured by GPC (calibration, polystyrene standard) at 54,000. The positions of the principal peaks in the infrared absorption spectrum of the bulk polymer were as follows (cm$^{-1}$):

| | |
|---|---|
| 2924.4 | 1444.8 |
| 1361.9 | 1313.6 |

-continued

| | |
|---|---|
| 1263.5 | 1211.4 |
| 1126.5 | 1066.7 |
| 1024.3 | 893.1 |
| 837.2 | 752.3 |
| 677.1 | 625.0 |
| 549.8 | 515.0 |
| 484.2 | |

Example 2. Following the procedure of Example 1, 100 mL dry toluene and then 3.07 g sodium were introduced into a 300 mL four-neck flask equipped with a condenser, addition funnel, and stirrer. While heating this liquid mixture at reflux with vigorous stirring, a liquid mixture of 6.33 g 3,3,3-trifluoropropylmethyldichlorosilane, 5.0 g cyclopentamethylenedichlorosilane, and 3.2 g dry toluene was carefully added dropwise from the addition funnel. The reaction was run for another 12 hours by vigorously stirring under reflux. After completion of the reaction, isopropyl alcohol was added to the reaction solution in order to precipitate the polysilane. This was then washed with water, filtered and dried to afford a colorless solid polysilane (8.5% yield).

The average molecular weight of this material was measured by GPC (calibration, polystyrene standard) at 32,000. The positions of the principal peaks in the infrared absorption spectrum of the bulk polymer were as follows (cm$^{-1}$):

| | |
|---|---|
| 2910.9 | 1446.7 |
| 1359.9 | 1197.9 |
| 1130.4 | 1070.6 |
| 983.8 | 895.1 |
| 837.2 | 750.4 |
| 682.9 | 628.9 |
| 549.8 | 509.3 |
| 432.1. | |

Example 3. Following the procedure of Example 1, 60 mL dry toluene and then 1.166 g sodium were introduced into a 200 mL four-neck flask equipped with a condenser, addition funnel, and stirrer. While heating this liquid mixture at reflux with vigorous stirring, a liquid mixture of 1.605 g 3,3,3-trifluoropropylmethyldichlorosilane, 3.0 g cyclopentamethylenedichlorosilane, and 2.0 g dry toluene was carefully added dropwise from the addition funnel. The reaction was run for another 10 hours by vigorously stirring under reflux. After completion of the reaction, isopropyl alcohol was added to the reaction solution in order to precipitate the polysilane. This was then washed with water, filtered and dried to afford a colorless solid polysilane (9.0% yield).

The average molecular weight of this material was measured by GPC (calibration, polystyrene standard) at 45,000. The positions of the principal peaks in the infrared absorption spectrum of the bulk polymer were as follows (cm$^{-1}$):

| | |
|---|---|
| 2918.6 | 2851.1 |
| 1444.8 | 1359.9 |
| 1311.7 | 1261.6 |
| 1211.4 | 1124.6 |
| 1064.8 | 981.9 |
| 910.5 | 837.2 |
| 754.2 | 613.4 |
| 484.2 | 424.4. |

Example 4. Following the procedure of Example 1, 60 mL dry toluene and then 0.95 g sodium were introduced into a 200 mL four-neck flask equipped with a condenser, addition funnel, and stirrer. While heating this liquid mixture at reflux with vigorous stirring, a liquid mixture of 2.11 g 3,3,3-trifluoropropylmethyldichlorosilane, 1.55 g cyclopentamethylenedichlorosilane, and 2.0 g dry toluene was carefully added dropwise from the addition funnel. The reaction was run for another 8 hours by vigorously stirring under reflux. After completion of the reaction, isopropyl alcohol was added to the reaction solution in order to precipitate the polysilane. This was then washed with water, filtered and dried to afford a colorless solid polysilane (9.5% yield).

The average molecular weight of this material was measured by GPC (calibration, polystyrene standard) at 9,000.

The positions of the principal peaks in the infrared absorption spectrum of the bulk polymer were as follows (cm$^{-1}$):

| | |
|---|---|
| 4338.3 | 3682.4 |
| 2928.2 | 2851.1 |
| 2598.4 | 2542.4 |
| 2476.8 | 2091.0 |
| 1446.7 | 1408.2 |
| 1361.9 | 1311.7 |
| 1263.5 | 1209.5 |
| 1124.6 | 1068.7 |
| 1020.4 | 943.3 |
| 895.1 | 835.3 |
| 767.7 | 652.0 |
| 549.8 | 491.9 |

The UV absorption maximum for this product in organic solvent occurred at 272 nm.

The properties of the compounds synthesized in Examples 1 to 4 are reported in Table 1.

TABLE 1

| Example | $R^3$ | Molecular Weight | n/m | Yield (%) | Absorption* Maximum (nm) |
|---|---|---|---|---|---|
| 1 | —$C_5H_{10}$— | 54,000 | 3 | 8.5 | 285 |
| 2 | —$C_5H_{10}$— | 32,000 | 1 | 8.5 | 280 |
| 3 | —$C_5H_{10}$— | 45,000 | 0.33 | 9.0 | 275 |
| 4 | —$C_4H_8$— | 9,000 | 1 | 9.5 | 282 |

*Note:
The value of the absorption maximum in the UV absorption spectrum in THF (tetrahydrofuran) for polysilane prepared in accordance with the present invention.

I claim:

1. A random polysilane composition having an average molecular weight within a range of 2,000 to 1,000,000 and described by formula

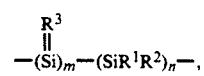

where $R^1$ is described by formula —$(CH_2)_xCF_3$ in which x=2, 3, or 4; each $R^2$ is independently selected from a group consisting of alkyls comprising one to five carbon atoms; $R^3$ is selected from a group consisting of —$C_5H_{10}$— and —$C_4H_8$—; $0.25 \leq n/m \leq 100$ when $R^3$ is —$C_5H_{10}$—, and $0.01 \leq n/m \leq 100$ when $R^3$ is —$C_4H_8$—.

2. A random polysilane composition according to claim 1, where the average molecular weight is within a range of 4,000 to 100,000.

* * * * *